United States Patent Office 2,800,593
Patented July 23, 1957

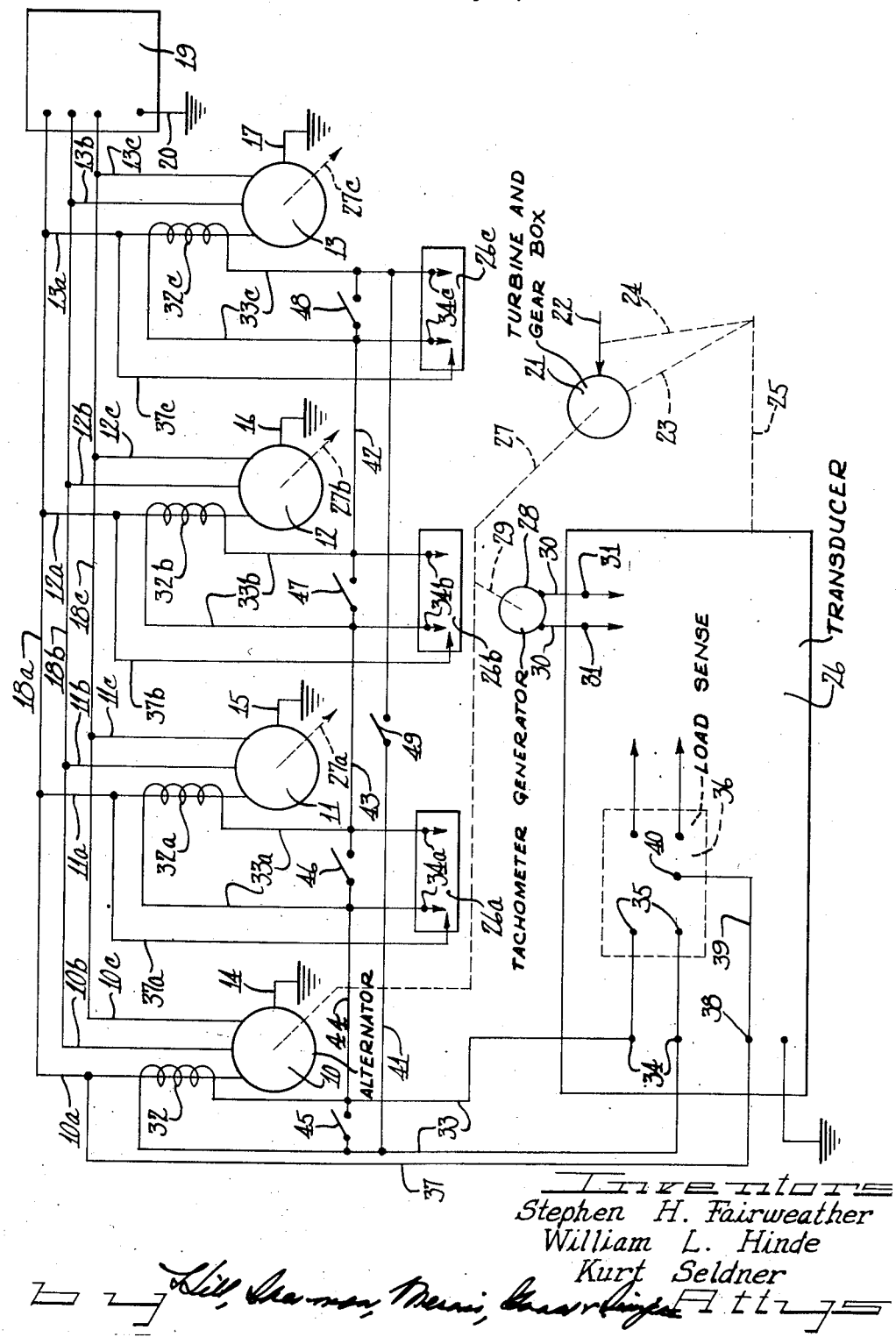

2,800,593
LOAD DIVISION TRIM CONTROL BY INTER-CONNECTED SENSING DEVICES

Stephen H. Fairweather, South Euclid, William L. Hinde, Euclid, and Kurt Seldner, Mayfield Heights, Ohio, assignors to Thompson Products, Inc., Cleveland, Ohio, a corporation of Ohio Application July 13, 1954, Serial No. 442,936

10 Claims. (Cl. 307—57)

The present invention relates to load division trim control by interconnected sensing devices, and more particularly relates to a system for controlling load division between paralleled alternators by interconnecting devices sensing operating conditions of the altenators.

Still more particularly, the invention relates to a system for interconnecting control means such as that described in the application for United States Letters Patent entitled "Control System For Turbine Driven Alternators," by Walter R. Chapman and Stephen H. Fairweather, United States Serial No. 382,582, filed September 28, 1953, to provide means to compensate for variations between the level of the two loads on each of the alternators when the alternators are connected in parallel to a common load.

In electrical power installations, and particularly in alternating current electrical power installations it has been found to be highly desirable practice from a point of view of economy and efficiency, to supply electrical power to the load generally by one or more of a plurality of alternators which may be connected in parallel. This parallel connection of a plurality of alternators is desirable since only one such alternator need be employed when supplying power to a small load while two, three or four alternators may be connected to the main power supply line for supplying power to relatively large loads.

When parallel alternators are employed, however, it is most important that the load be divided substantially equally therebetween, when the alternators are of substantially equal capacity, and that the alternators be operated in phase and at substantially the same speed, since to do otherwise would result in a tendency for one or more of the alternators to assume substantially all of the load and thereby be overloaded while other of the alternators would tend to give up their load and thereby run as motors. Such mal-operation is obviously detrimental and undesirable.

In the above identified application for patent by Walter R. Chapman and Stephen H. Fairweather there is described a system for controlling the speed and power input to each of a plurality of alternators so that the droop characteristic thereof will be accurately controlled and when a plurality of alternators using such controls are paralleled, they will have substantially identical droop characteristics. By having very similar or substantially identical droop characteristics the alternators will tend to operate in a parallel system with substantially equal load divisions therebetween.

One of the principal and most important features of the present invention lies in the provision of a system of interconnecting the system described in the hereinabove identified application so as to insure proper load division between alternators when the same are interconnected and operating as controlled by the transducer and control systems described in the above identified application.

In that transducer control system, each transducer has real load sensing means therein connected to the alternator which it controls so that one of the parameters which actuates the transducer is a real load sensing signal. This signal together with a signal from a speed sensing network, and other signals control the alternator drive, and more particularly the input speed and power to the alternator drive so that when the alternator should assume a greater portion of the load or when a greater load is thrown on the alternator, the input drive power will be increased to bring the alternator back to its set speed or to a preselected level therebelow depending upon the controllable desired droop characteristic for the alternator.

Although the manner of detail operation of the transducer control system forms no part of the present invention, it has been described in the above identified application as having particular utility in aircraft installations and is particularly adaptable for controlling pneumatic driven turbines coupled to the alternators for driving the alternators. Its particular applicability and adaptability to aircraft installations is enhanced by the compactness of the unit and the lightweight of the total package.

So too, the system of the present invention is particularly adaptable to such an aircraft pneumatic-electric power system since it adds substantially no weight to the entire system and does not enlarge the bulk of the system.

In accordance with the principles of the present invention the load sensing network of each of the transducers for the several alternators to be connected in parallel may be connected together on the input sides thereof in series so that unbalances between the real load sensing signals thereto may be corrected and the alternators may be operated isochronously. More particularly, the real load sensing networks of the transducer control systems may be coupled to the alternators respectively by a current transformer, or equivalent means, which will provide a current sensing signal to the real load sensing network, and by a potential lead connected to one of the output leads of the respective alternator. As hereinafter described in detail, the trim control inter-connection of the transducers may be effected by interconnecting the outputs of the current transformers in series so that unbalances therebetween will result in variations of the signals provided to the reel load sensing networks so that the transducers will be actuated to control the drive for the individual alternators in such a manner that the alternators will be operated isochronously with substantially equal loads thereon, or with the common load substantially equally divided therebetween.

Numerous other objects, features and advantages of the present invention will become readily apparent to those skilled in the art from the following detail description of the present invention and from the accompanying drawing in which each and every detail shown is fully and completely disclosed as a part of this specification, and in which there is schematically illustrated an embodiment of the present invention.

Although any desired plurality of alternators may be operated together in parallel to supply power to a load, in the system illustrated on the drawings four such alternators 10, 11, 12 and 13 of the grounded neutral type as indicated at 14, 15, 16 and 17 have been shown. Each of these alternators has three power leads (the A, B and C phases thereof), 10a, 10b and 10c, 11a 11b and 11c 12a, 12b and 12c, 13a, 13b and 13c, respectively. The "A" leads are connected to the "A" but 18a, while the "B" leads are connected to the bus 18b and the "C" leads are connected to the bus 18c, the busses in turn being connected to the common load 19 which may have a grounded point such as indicated at 20.

The alternators may be driven by a pneumatic turbine or the like through a gear box, with the turbine being supplied with air power through a supply line and being controlled by a transducer control system which is coupled to the output of the individual alternators. For simplicity of illustration and description, only one such supply line, turbine and transducer has been shown in the proper interconnected relation on the drawings, it being understood that the transducers and turbines, etc., for the other alternators are substantially identical to the one illustrated and described.

Therefore, as shown, the alternator 10 is driven by a pneumatic turbine and gear box indicated schematically at 21 and supplied with air power through a supply line 22. The turbine and supply lines are coupled, as indicated by the broken mechanical coupling lines 23, 24 and 25 to the output of a transducer control system 26 such as described in the hereinabove identified application. The alternator is coupled to the turbine and gear box as indicated by the broken mechanical coupling line 27. Also coupled to the output of the pneumatic turbine and gear box is a speed sensing unit such as a tachometer generator 28 which is mechanically coupled as indicated by the broken mechanical coupling line 29 and which has an output the frequency of which is directly related to the speed of the alternator. The output of the tachometer generator 28 is taken over leads 30—30 to an appropriate pair of terminals 31—31 on the transducer control system 26 and there fed into the transducer control system.

The broken arrows 26a, 27b and 27c on the alternators 11, 12 and 13 indicate that those alternators will be driven in substantially the same manner in which the alternator 10 is driven and controlled.

In addition to a speed sensing signal from the tachometer generator 28, the transducer 26 is also supplied with load sensing signals including a current sensing signal supplied thereto from the output of a current transformer 32 on the output lead 10a of the alternator 10. This current sensing signal is fed to the transducer control system over leads 33—33 to appropriate terminals 34—34 on the transducer control system which lead to appropriate terminals 35—35 on a real load sensing network schematically indicated at 36. Also, a potential carrying lead 37 is connected to the alternator lead 10a at one end thereof and to an appropriate terminal 38 on the transducer control system and from the terminal 38 through a lead 39 to an appropriate terminal 40 in the real load sensing network 36.

In a like manner, current sensing means such as the current transformers 32a, 32b and 32c are coupled to the alternator output leads 11a, 12a and 13a, respectively, and are connected through leads 33a—33a, 33b—33b and 33c—33c to appropriate terminals 34a—34a, 34b—34b and 34c—34c on the transducer control systems 26a—26b—26c and to the real load sensing networks therein. Also, potential sensing leads 37a—37b and 37c are respectively connected to the leads 11a, 12a and 13a and to the transducer control systems 26a, 26b and 26c and therein to the respective real load sensing networks.

With the alternators thus driven and connected to their respective transducer control systems, each thereof will have a predetermined and manufactured droop characteristic which will be controlled in accordance with the settings in the transducer control system, the transducer control system being operative in accordance with signals provided thereto and in accordance with the operating parameters of the alternators. When still operating the load on each of the alternators will be divided substantially equally so long as the droop characteristics thereof are substantially identical. Because of various factors which are inherent in the systems, however, and various other transient factors, these systems may tend to go into an unbalanced condition which will be aggravated by the natural operating characteristics of the alternators. Therefore, an important feature of the system herein described lies in inter-connecting the control systems so that variations between the loads thereon will be corrected and the alternators will operate isochronously and with the loads substantially equally divided therebetween. One manner of inter-connecting the control systems is to connect the outputs of the current transformers 32, 32a, 32b and 32c in series as by leads 41, 42, 43 and 44. These leads are so connected into the system that one end of the lead 41 is connected at one of its ends to one of the leads 33 while the other end thereof is connected to one of the leads 33c, while the lead 42 has one of its ends connected to the other of the leads 33c and to one of the leads 33b, the lead 43 having one of its ends connected to the other of the leads 33b and to one of the leads 33a and with the lead 44 having its ends connected to the other of the leads 33a and to the other of the leads 33.

With these leads connected into the system in the described manner, unequal outputs in the current transformers 32, 32a, 32b and 32c, resulting in unequal inputs to the transducers 26, 26a, 26b and 26c and the load sensing networks 40 therein, will result in appropriate variations in the input to the transducers to correct and compensate for variations between the loads on the alternators 10, 11, 12 and 13. That is an example, if the load on the alternator 10 is too great, then the leads 41, 42, 43 and 44 will carry appropriate signals to the load sensing systems in the transducer control systems 26a, 26b and 26c to cause the alternators 11, 12 and 13 to carry an increased share of the load until the load is divided substantially equally between the alternators and the alternators carry substantially equal loads.

Since the alternators are not always all used at the same time, means has been provided for cutting the control elements thereof out of the control system. Such means includes short circuiting switches 45, 46, 47 and 48 which are connected across the outputs of the current transformers 32, 32a, 32b and 32c, respectively. It will be understood, of course, that the short circuiting switches or circuit breaker contacts are open while the respective alternators are connected together in parallel and are closed for short circuiting the respective current transformers when the respective alternators are out of the system. Appropriate means such as switches and indicator devices (not shown) may be employed to connect and disconnect the alternator power leads from the busses.

In addition, means such as a switch 49 in the line 41 may be employed to open the line and thereby open the interconnection between the alternator controls when it is desired to use only one of the alternators to supply power to the load 19.

It will be understood that numerous variations and modifications may be made without departing from the true spirit and scope of the novel concepts and principles of our invention.

We, therefore, intend to cover all such modifications and variations as fall within the true spirit and scope of the novel concepts and principles of our invention.

We claim as our invention:

1. A system to substantially equally divide a load between parallel interconnected alternators and to cause the same to operate isochronously wherein the input speed and power of the alternators is controlled by a transducer control system for each of the alternators respectively, each of said transducer control systems having means therein to sense the load on the alternator controlled thereby respectively, and means interconnecting the load sensing means of said transducer control systems whereby variations between the loads on the individual alternators will be corrected and the alternators will be operated isochronously with equal loads thereon.

2. A system to substantially equally divide a load between parallel interconnected alternators and to cause the same to operate isochronously wherein, the input speed and power of the alternators is controlled by a transducer control system for each of the alternators respectively, each of said transducer control systems having means therein to sense the load on the alternator controlled thereby respectively, and means interconnecting the load sensing means of said transducer control system in series whereby variations between the loads on the individual alternators will be corrected and the alternators will be operated isochronously with equal loads thereon.

3. A system to substantially equally divide a load between parallel interconnected alternators and to cause the same to operate isochronously wherein, the input speed and power of the alternators is controlled by a transducer control system for each of the alternators respectively, each of said transducer control systems having means therein to sense the load on the alternator controlled thereby respectively, and means interconnecting the load sensing means of said transducer control system in series at the input side thereof whereby variations between the loads on the individual alternators will be corrected and the alternators will be operated isochronously with equal loads thereon.

4. A system to substantially equally divide a load between parallel interconnected alternators and to cause the same to operate isochronously wherein, the input speed and power of the alternators is controlled by a transducer control system for each of the alternators respectively, each of said transducer control systems having means therein to sense the load on the alternator controlled thereby respectively, each of said load sensing means having alternator current sensing means and alternator potential sensing means, said current sensing means being connected together whereby variations between the loads on the individual alternators will be corrected and the alternators will be operated isochronously with equal loads thereon.

5. A system to substantially equally divide a load between parallel interconnected alternators and to cause the same to operate isochronously wherein, the input speed and power of the alternators is controlled by a transducer control system for each of the alternators respectively, each of said transducer control systems having means therein to sense the load on the alternator controlled thereby respectively, each of said load sensing means having alternator current sensing means and alternator potential sensing means, said current sensing means being connected together in series whereby variations between the loads on the individual alternators will be corrected and the alternators will be operated isochronously with equal loads thereon.

6. A system to substantially equally divide a load between parallel interconnected alternators and to cause the same to operate isochronously wherein the input speed and power of the alternators is controlled by a transducer control system for each of the alternators respectively, each of said transducer control systems having means therein to sense the load on the alternator controlled thereby respectively, each of said load sensing means having alternator current sensing means and alternator potential sensing means, said current sensing means being connected together whereby variations between the loads on the individual alternators will be corrected and the alternators will be operated isochronously with equal loads thereon, and means connected to each of said current sensing means to short circuit the same when the respective alternator is disconnected from the others and not in use.

7. A system to substantially equally divide a load between parallel inter-connected alternators and to cause the same to operate isochronously wherein the input speed and power of the alternators is controlled by a transducer control system for each of the alternators respectively, said transducer control system being connected together by means inter-connecting the load sensing means of said transducer control systems whereby variations between the loads on the individual alternators will be corrected and the alternators will be operated isochronously with equal loads thereon.

8. A system to substantially equally divide a load between parallel inter-connected alternators and to cause the same to operate isochronously wherein the input speed and power of the alternators is controlled by a transducer control system for each of the alternators respectively, said transducer control systems being connected together by means interconnecting the load sening means of said transducer control systems in series whereby variations between the loads on the individual alternators will be corrected and the alternators will be operated isochronously with equal loads thereon.

9. A system to substantially equally divide a load between parallel inter-connected alternators and to cause the same to operate isochronously wherein the input speed and power of the alternators is controlled by a transducer control system for each of the alternators respectively, means to supply input signals to said transducer control systems in accordance with operating parameters of the alternators respectively, said means being connected together by means inter-connecting the sensing means of said transducer control systems whereby variations between the loads on the individual alternators will be corrected and the alternators will be operated ischoronously with equal loads thereon.

10. A system to substantially equally divide a load between parallel inter-connected alternators and to cause the same to operate isochronously wherein the input speed and power of the alternators is controlled by a transducer control system for each of the alternators respectively, means to supply input signals to said transducer control systems in accordance with operating parameters of the alternators respectively, said means being connected together by means inter-connecting the sensing means of said transducer control systems in series whereby variations between the loads on the individual alternators will be corrected and the alternators will be operated isochronously with equal loads thereon.

References Cited in the file of this patent
UNITED STATES PATENTS

| Re. 20,548 | Doyle | Nov. 8, 1937 |
| 2,458,325 | Warren | Jan. 4, 1949 |
| 2,504,768 | Watson | Apr. 18, 1950 |